United States Patent [19]

DiSanto et al.

[11] Patent Number: 5,302,235
[45] Date of Patent: * Apr. 12, 1994

[54] DUAL ANODE FLAT PANEL ELECTROPHORETIC DISPLAY APPARATUS

[75] Inventors: Frank J. DiSanto, North Hills; Denis A. Krusos, Lloyd Harbor, both of N.Y.

[73] Assignee: Copytele, Inc., Huntington Station, N.Y.

[*] Notice: The portion of the term of this patent subsequent to Oct. 1, 2008 has been disclaimed.

[21] Appl. No.: 719,021

[22] Filed: Jun. 21, 1991

Related U.S. Application Data

[63] Continuation-in-part of Ser. No. 345,825, May 1, 1989, Pat. No. 5,053,763.

[51] Int. Cl.$^5$ .................................................. G09G 3/34
[52] U.S. Cl. .................................... 156/643; 156/655; 156/656
[58] Field of Search ................... 156/656, 643, 655; 359/296; 340/787

[56] References Cited

U.S. PATENT DOCUMENTS 5,053,763 10/1991 DiSanto et al. ............... 359/296 X Primary Examiner—Thi Dang
Attorney, Agent, or Firm—Arthur L. Plevy

[57] ABSTRACT

An electrophoretic display has a grid cathode matrix arrangement consisting of a first plurality of parallel conductive lines insulated from a second plurality of parallel conductive lines transverse to said first plurality. Located with respect to the grid and cathode lines are first and second anode structures. The first anode is remote from the second with the second anode overlying the gird lines of the display and insulated therefrom. The second anode is biased to implement typical HOLD and ERASE modes independent of the first anode.

7 Claims, 1 Drawing Sheet

DUAL ANODE FLAT PANEL ELECTROPHORETIC DISPLAY APPARATUS

This application is a continuation-in-part of prior application Ser. No. 07/345,825 filed on May 1, 1989 and now U.S. Pat. No. 5,053,763.

BACKGROUND OF THE INVENTION

This invention relates to an electrophoretic display apparatus in general and more particularly to an electrophoretic display apparatus having a dual anode structure.

The electrophoretic display (EPID) is well known and there exists many patents and articles in the prior art which describe the construction, nature as well as describing the operation of such displays. The following patents are illustrative of prior art devices and approaches. These patents issued to Frank J. DiSanto and Denis A. Krusos, the inventors herein and are assigned to Copytele, Inc., the assignee herein.

See for example, U.S. Pat. No. 4,655,897 issued on Apr. 7, 1987 entitled ELECTROPHORETIC DISPLAY PANELS AND ASSOCIATED METHODS.

This patent describes a typical electrophoretic display apparatus utilizing an XY matrix consisting of grid and cathode lines which are insulated one from the other and which are associated with an anode electrode and having the space between the grid and cathode lines and the anode electrode filled with an electrophoretic dispersion. The patent describes techniques for making such displays as well as suitable dispersions for use with such displays.

U.S. Pat. No. 4,732,830 issued on Mar. 22, 1988 entitled ELECTROPHORETIC DISPLAY PANELS AND ASSOCIATED METHODS. This patent describes methods for making electrophoretic displays as well as describing display construction and operation.

U.S. Pat. No. 4,742,345 entitled ELECTROPHORETIC DISPLAY PANEL APPARATUS AND METHODS THEREFOR issued on May 3, 1988. This patent describes improved electrophoretic display panels exhibiting improved alignment and contrast with circuitry for implementing the same as well as methods for providing such a panel.

U.S. Pat. No. 4,746,917 issued on May 24, 1988 entitled METHOD AND APPARATUS FOR OPERATING ELECTROPHORETIC DISPLAYS BETWEEN A DISPLAY AND A NON-DISPLAY MODE. This patent describes various biasing techniques for operating electrophoretic displays to provide writing, erasing as well as operating the display during a display and non-display mode.

U.S. Pat. No. 4,772,820 issued on Sep. 20, 1988 entitled MONOLITHIC FLAT PANEL DISPLAY APPARATUS. This patent describes methods and apparatus for fabricating flat panel displays employing electrophoretic principles to enable such displays to be biased and driven by additional circuitry.

As one will understand by reviewing the above-noted patents as well as additional subject matter, an important object of the prior art is to provide an improved display with increased contrast, faster operating time, and more reliable performance. A particularly disturbing problem which occurs in electrophoretic displays results in the appearance of a bright "flash" emanating from the display during the ERASE mode. This "flash" while occurring over a relatively short period is perfectly visible. The "flash" appears disturbing to many individuals who view the display and is caused by the following phenomenon. For proper operation of the electrophoretic display, the amount of pigment in the suspension is considerably greater than the pigment required to give a suitable background when the panel is in a HOLD condition. The term HOLD is known in the art, and essentially the electrophoretic panel is placed in a HOLD condition prior to writing the display. In this manner the HOLD condition is achieved when the anode is at a high positive voltage, the grid is at a low voltage, and the cathode is at a high voltage.

Typically, the anode would be at a voltage for example of 200 volts with the grid at a lower voltage as for example $-12$ volts with the cathode at a high voltage which would be $+15$ volts. With these voltages on the typical prior art electrophoretic display, the display is in the so-called HOLD condition. This HOLD condition is implemented prior to the writing mode during which mode new information is written into the display. The excess pigment during the HOLD condition is at the surface of the anode which is at the highest potential with respect to any other of the electrodes. To ERASE the display, the anode is made negative and all the pigment leaves the anode and is at the surface of the grid and cathode. During ERASE, the anode, for example, would be placed at $-200$ volts. Hence during the ERASE mode, all the pigment leaves the anode and is now at the surface of the grid and cathode accordingly. The cathode side of the flat display during the ERASE mode is considerably brighter than it is during the HOLD causing a bright "flash" to appear on the display even when the ERASE time is extremely short.

The "flash" occurs between frames and may repeat every 20 to 30 milliseconds caused by the change in brightness between the HOLD and the ERASE mode. It is, of course, desirable to eliminate this bright "flash" so that the display appears more uniform and stable.

It is a further object to increase the speed of the flat panel display while further reducing the anode voltage required during the WRITE and HOLD cycles.

SUMMARY OF THE INVENTION

In an electrophoretic display of the type having a cathode matrix comprising a plurality of parallel lines arranged in a given direction, with a grid matrix insulated from said cathode matrix and comprising a plurality of parallel lines each perpendicular to said cathode lines to form an X-Y addressing matrix with a conventional anode electrode separated from said X-Y matrix with the space between said anode electrode and said X-Y matrix accommodating an electrophoretic dispersion including pigment particles suspended in a fluid, the improvement therewith of an additional anode electrode comprising a plurality of parallel lines each associated with and insulated from a respective grid line with said additional anode operative when biased to control the path of said pigment particles to and from said grid and cathode matrix and to allow excess pigment to remain at said conventional anode electrode.

DETAILED DESCRIPTION OF THE FIGURES

Referring to FIG. there is shown a cross sectional view of an electrophoretic display 10 constructed according to the teachings of this invention.

Figure 1:
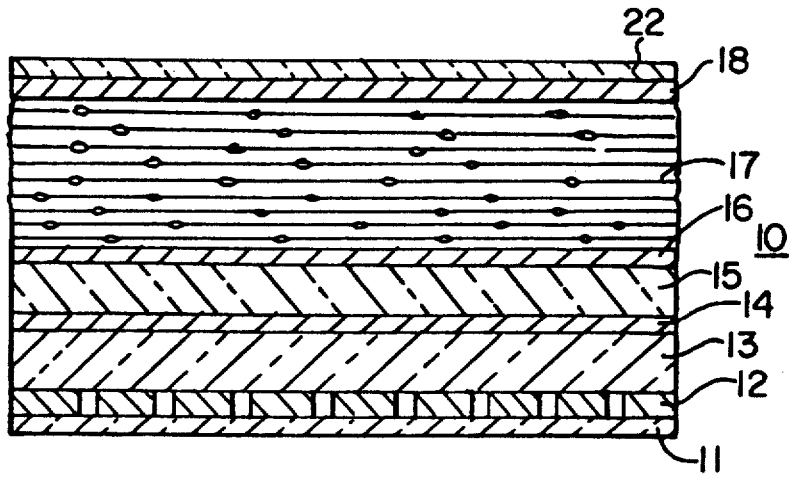
FIG. 1 is a cross sectional view of an electrophoretic display according to this invention.

As one can see from FIG. 1, the display 10 basically appears as prior art displays with the exception that there is an additional electrode 16 which will be designated as a local anode as compared to the remote anode 18. The remote anode 18 is the conventional anode associated with the prior art electrophoretic displays. As one will understand, the electrophoretic display as described in many of the prior art patents as above indicated has a viewing area which includes a bottom glass sheet 11. Disposed upon sheet 11 are a plurality of cathode lines 12. These cathode lines 12 are directed in the horizontal or vertical direction and are essentially parallel to one another to form a matrix or grid of lines. Separated from the cathode lines by means of a photoresist or insulator 13 is a plurality of grid lines 14. The grid lines are disposed transverse to the cathode lines and intersect each cathode line to provide an XY matrix arrangement whereby a typical pixel area is accessed by addressing a grid and cathode line and thereby providing a desired potential at the intersection between the two lines. This potential causes the migration of electrophoretic particles which are suspended in the electrophoretic suspension 17 and which particles migrate from the grid and cathode structure to the anode 18. The anode 18 is a very thin layer of metal deposited upon a planar glass member 22 according to prior art teachings.

Figure 2:
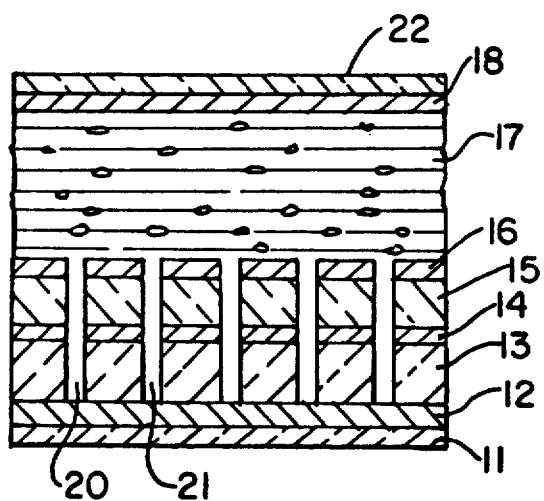
FIG. 2 is a cross sectional view of the display of FIG. 1.

Referring to FIG. 2, there is shown a side cross sectional view of the electrophoretic display. The cathode lines 12 which are thin layers of ITO are deposited upon the glass substrate 11 with the grid lines 14 being perpendicular thereto and insulated from the cathode line by means of insulator layer 13. The thickness of the insulator areas as 13 and 15 is approximately 3 microns with the distance from the top of insulator 15 to the remote anode electrode 18 being about 7 mils. As seen more clearly in FIG. 2, each grid line 14 is separated from a local anode line 16 by means of an insulator layer 15.

In this manner the local anode 16 is of the same exact configuration as the grid structure 14. The anode 16 is separated from the grid by the insulating layer 15 and is configured the same as the grid structure. Thus, there are as many anode segments as there are grid segments. Each segment of the anode can have the same exact configuration as the grid. For example, U.S. Pat. No. 4,742,345 describes a grid structure fabricated with respect to the cathode structure in the configuration depicted in FIG. 3. As one can see from FIG. 3, each of the grids is fabricated by utilizing deposited metal on an insulator whereby a top conductive area or contact area 30 is provided which conductive area 30 is above a bottom conductive area 31. Disposed between areas 30 and 31 are a series of tines 32 which are grid conductors.

Figure 3:
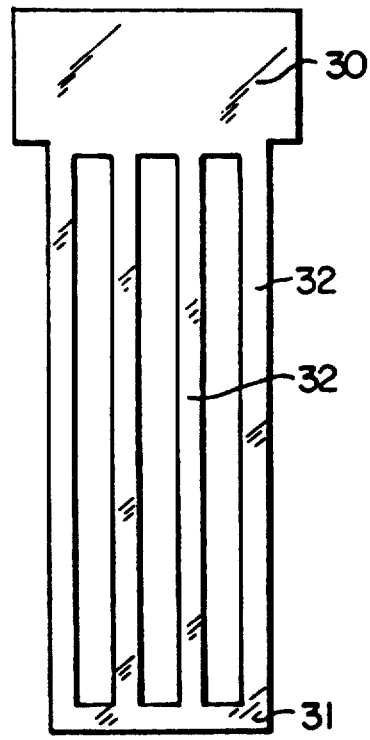
FIG. 3 is a front plan view of a typical grid line and also a configuration of a typical local anode line.

As one can understand, the parallel conductor members 32 as connected in parallel by the contact pair 30 and 31 provide a plurality of intersecting points for each of the grid structures with respect to the cathode line. The advantage of such an arrangement has been fully explained and described in U.S. Pat. No. 4,742,345. If the grid structure of FIG. 3 is employed then the anode structure 16 will follow the grid structure. In this manner it is seen that the local anode 16 may consist of a plurality of parallel lines each of which is associated with a grid line with each of the parallel lines being dimensioned and congruent with each of the associated grid lines.

One can, of course, connect all the anode lines together at both contact areas 30 and 31 or one can drive each of the anode lines separately or in groups. As will be explained if the anode lines are separately driven or driven in regard to associated groups then one can achieve selective erasing as well as selective writing with this display. For purposes of explaining the operation of the unique flat panel display depicted in FIG. 1 and FIG. 2, first assume that all the anode segments 16 or anode lines are connected in parallel. In this manner the operation is as follows.

To obtain a full ERASE from the remote anode 18, one applies a negative high voltage to the remote anode 18 which for example is $-200$ volts. One then applies a negative low voltage to the local anode 16 or to each of the local anode lines 16 of $-15$ volts. In this manner one then keeps the grid at a low voltage as for example $-12$ volts and keeps the cathode lines at a high voltage which is $+15$ volts. These biasing levels operate to ERASE the display and cause all the pigment to be transported to the surface of the grid to cathode. During a first HOLD mode, the excess pigment is brought to the remote anode 18. In this first HOLD mode the anode 18 which is the remote anode is held at a positive high voltage which may be for example $+200$ volts. The local anode 16 is placed at a positive low voltage which is $+15$ volts and the grid and cathode are held at $-12$ volts and $+15$ volts respectively as indicated above for the full ERASE mode. This first HOLD mode operates to bring the excess pigment to the remote anode as described above. As once can ascertain, the brightness of the display between HOLD and ERASE differs as described above.

In a second HOLD mode anode voltage 18 is biased at a positive low voltage which is $+15$ volts while the anode 16 is placed at the same positive low voltage which is $+15$ volts. The grid and cathode again are at the same potentials as the full ERASE mode or as in the first HOLD mode as indicated above. In this second HOLD, as one can ascertain, since anodes 18 and 16 are at the same potential, all the excess pigment is held mainly at anode 18 with very little pigment being held at anode 16.

In order to implement a writing operation, this is done as was accomplished in the prior art flat panels. For a WRITE the anode 18 is held at a low voltage as $+15$ volts. Anode 16 is also held at the same positive low voltage. The grid and cathodes will enable a WRITE when a grid line is at a high condition with respect to a cathode line which is at a low condition. When both the grid and cathodes are both high, there will be no writing. In a similar manner if grid and cathodes are both low, there is no writing; or if the grid is low and cathode is high, there is no writing.

Hence, as one can understand, the only time a pixel is written into is when the respective grid line is high with the cathode line being low and hence causing particle migration at the intersection between that grid and that cathode to thereby perform a writing operation. An ERASE mode from the anode structure 16 is as follows.

In this ERASE mode, the anode 18 is held at a low positive voltage $+15$. The anode lines 16 are held at a negative voltage which is ground potential or zero. In order to implement an ERASE, one requires the grid and cathode line at an intersection both to be high. The high condition on both grid and cathode lines will produce an ERASE signal at that pixel. There will be no ERASE when the grid is low with respect to the cathode being high or when the grid is low and the cathode is low or when the grid is high and the cathode is low. The only time an ERASE will occur is when both the grid and cathode are at a high voltage which may be +15 volts. It is obvious when considering the mode designated as ERASE that the flat panel can be completely ERASED by making all the grids and cathodes high and the voltage at the anode 16 or each anode line zero. In a similar manner one can selectively ERASE by making the anode voltage zero and scanning the cathodes with a high and for each cathode made high selecting which grids are also to be high.

In this manner, one can provide selective erasing at any grid and cathode intersection. In a similar manner one can ERASE on a line by line basis. This will occur by scanning the anode lines and placing each anode line at ground during a scan interval and simultaneous therewith providing the associated grid lines with a high and the associated cathode line with a high. In this manner as one can see, one can ERASE a single line at a time or ERASE any particular line in the display at any instant of time.

The selective ERASE may be performed by scanning the entire panel or by pointing and scanning only certain character lines. The selective ERASE permits correction of a character or characters, blinking of a character or characters and allows access to any pixel in the entire display. By utilizing the above-described local anode 16, one can selectively ERASE any point or pixel in the display as well as selectively ERASE line by line.

Furthermore, since the excess pigment is caused to remain at the remote anode then one does not in any manner see the "flash" when erasure occurs from the local anodes 16 as compared to the prior art erasing mode which occurred at the remote anode 18. The panel is fabricated utilizing the same techniques as evidenced by the prior art. Thus the display shown is operated by first providing the HOLD function from the remote anode 18 and thereafter ERASING and HOLDING from the local anode 16.

As one can ascertain from referring to U.S. Pat. No. 4,742,345, the cathode configuration is deposited upon the glass sheet 11 employing ITO and is constructed in the same manner as implemented in previous flat panels. An insulator which is a photoresist is applied to the cathode structure and the insulator is then coated with a thin layer of metal (metal 1). This metal layer may also be ITO or chrome or some other material.

An insulator is applied to the metal layer and a thin layer of another metal (metal 2) is then applied to the insulator. This other metal may be nickel or chrome. A layer of photoresist is applied to the second metal layer and is patterned in the usual way utilizing the grid mask. The metal layer 2 is then etched using a suitable etching solution depending upon the properties of the metal. The insulating layer between the first metal layer and the second metal layer is plasma etched. Using a suitable etching solution, the metal layer 1 is etched again. The additional metal layer is etched utilizing a suitable etching solution depending upon the properties of the second metal layer. The insulating layer between the first metal layer and the second metal layer is plasma etched. One employs a suitable etching solution to etch metal 1. It is indicated that the first metal layer and the second metal layer are selected such that the etching solution for the first metal layer does not effect the second metal layer. There are many solutions which will etch certain materials while not etching others.

The insulating layer between metal layer 1 and the cathode is next plasma etched. The display parts comprising the structure indicated in FIG. 2 are assembled using appropriate spacers. The metal in the chip area is etched leaving only the insulator between metal layer 1 and metal layer 2 and the insulator between metal layer 2 and the cathode. The resulting local anode 16, grid 14, and insulating layer 13,15 structure is then covered with an insulator such as silicon dioxide ($SiO_2$). The insulator on the surface of the first metal layer is removed and the flat panel is ready to receive the chips. The prior art panels including the chips of the panel are further described in conjunction with the prior art patents.

The difference between the structure here and those of the prior art is the inclusion of an additional and different anode structure which is a series of lines congruent with and insulated from the grid lines. The second anode line structure can have all lines connected together at both top and bottom as described above or each of the anode lines can be separately addressed. The anode is for example fabricated from aluminum with the grid being fabricated from chrome. In this manner, one can utilize different etchants to form the local anode structure 16 as compared to the typical grid structure 14 and hence obtain all the benefits of the above-noted structure.

We claim:

1. A method of fabricating an electrophoretic display comprising the steps of:
   forming a cathode configuration on a glass sheet wherein said cathode consists of a plurality of separate metallic lines,
   applying a first insulator to cover said cathode,
   coating said insulator with a thin layer of a first metal,
   applying a second insulator layer to cover said first metal layer,
   coating said second insulator layer with a thin layer of a second metal,
   forming a first pattern consisting of a plurality of transverse lines to said cathode lines in said second metal layer,
   removing said second insulator layer between said between said first pattern of lines and said cathode lines,
   forming a second pattern consisting of a plurality of congruent lines to said first pattern of lines,
   removing said first insulating layer between said second pattern of lines and said cathode lines to form an electrophoretic display structure,
   applying a covering layer of insulator over said structure.

2. The method according to claim 1, wherein said cathode lines are ITO.

3. The method according to claim 1, wherein said first metal is chrome.

4. The method according to claim 1, wherein said second metal is selected from nickel or aluminum.

5. The method according to claim 1, wherein said step of removing said second insulator layer includes plasma etching said layer.

6. The method according to claim 1, wherein the step of forming said first pattern includes selectively etching said metal layer employing a selective etch.

7. The method according to claim 1, wherein said covering layer is silicon dioxide ($SiO_2$).

* * * * *